(12) United States Patent
Wang

(10) Patent No.: US 11,708,121 B2
(45) Date of Patent: Jul. 25, 2023

(54) ADAPTOR BAR FOR BICYCLES

(71) Applicant: Chiu Kuei Wang, Taichung (TW)

(72) Inventor: Chiu Kuei Wang, Taichung (TW)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 420 days.

(21) Appl. No.: 17/025,773

(22) Filed: Sep. 18, 2020

(65) Prior Publication Data

US 2021/0331756 A1    Oct. 28, 2021

(30) Foreign Application Priority Data

Apr. 27, 2020   (TW) .................................. 109205019

(51) Int. Cl.
  *B62H 3/12*     (2006.01)
  *B62K 13/08*    (2006.01)

(52) U.S. Cl.
  CPC .............. *B62H 3/12* (2013.01); *B62K 13/08* (2013.01)

(58) Field of Classification Search
  CPC . B62H 3/12; B62H 3/02; B62K 13/08; B62K 3/06; B62K 3/02; B21D 19/088; B21D 28/26; B62J 50/00; B62J 50/10; B60R 9/10
  See application file for complete search history.

(56) References Cited

U.S. PATENT DOCUMENTS

| | | | | |
|---|---|---|---|---|
| 6,036,215 A * | 3/2000 | Bruner | ................... | B62K 13/08 280/240 |
| 6,435,523 B1 * | 8/2002 | Hilk | ...................... | B62K 13/08 280/7.11 |
| 6,503,019 B1 * | 1/2003 | Wang | ...................... | B62K 13/00 403/321 |
| 6,602,015 B1 * | 8/2003 | Evans | ...................... | B60R 9/10 403/109.5 |
| 6,968,723 B2 * | 11/2005 | Akahane | ............... | B41J 2/1623 29/890.142 |
| 7,712,614 B2 * | 5/2010 | Carlson | ................ | F16M 11/242 248/176.1 |
| 9,788,657 B2 * | 10/2017 | Chen | ...................... | B21D 22/04 |
| 10,174,773 B2 * | 1/2019 | Wang | ...................... | B62H 3/02 |
| 10,328,984 B2 * | 6/2019 | Wang | ...................... | B62K 3/04 |

FOREIGN PATENT DOCUMENTS

| | | | | |
|---|---|---|---|---|
| CN | 107214230 A | * | 9/2017 | ........... B21D 19/088 |
| GB | 2515754 A | * | 1/2015 | ............. B21D 28/26 |

* cited by examiner

*Primary Examiner* — Steve Clemmons

(74) *Attorney, Agent, or Firm* — Che-Yang Chen; Law Office of Michael Chen

(57) ABSTRACT

An adaptor bar includes a retractable tube unit. Two end parts are respectively connected to two respective ends of the tube unit. Two C-shaped hooks are respectively fixed to the two ends of the tube unit. Each hook includes a first connection portion. Two plates are respectively connected to the two end parts. Each plate includes a first section, a second section and a third section. The second section is formed inclinedly between the first and third sections. The third section of each plate is fixed to the end part corresponding thereto. The first section of each plate is removably engaged with the first connection portion of the hook by sliding the end part. The first section includes a first recess and a second recess. The second recess is located close to the second section and includes a recessed reinforcement which reinforces a portion between the first and second sections.

5 Claims, 5 Drawing Sheets

ADAPTOR BAR FOR BICYCLES

BACKGROUND OF THE INVENTION

1. Fields of the Invention

The present invention relates to an adaptor bar of a bicycle, and more particularly, to a slidable plate to close the hooked end of the adaptor bar.

2. Descriptions of Related Art

One of the conventional bicycle racks known to applicant includes at least one support part which is designed to support the bicycle top tube so as to load the bicycle to a bicycle rack. However, a lady's bike does not have the top tube so that an adaptor bar is used to perform as the top tube. Generally, the adaptor bar includes two hooks connected to two ends of the adaptor bar. Each hook includes a plate which is used to form an opening or to close the opening relative to the hook. Each plate is connected to an end part that is slidably connected to a tube. When the two end part is slid along the tube, the plate is moved with the end part, the bicycle head tube and seat post can be inserted into the hook via the opening. When returning the end part, the plate is moved to close the opening so that the adaptor bar is installed to the bicycle. Therefore, the adaptor bar plays the role as the top tube. The distance between the two hooks can be adjusted by the above movement of the end parts to allow the two hooks to reach the head tube and the seat post.

As shown in FIG. 1, the plate 60 used to the adaptor bar mentioned above is an elongate plate and includes two holes 62, 63 so that screws (not shown) extend through the two holes 62, 63 so as to connect the plate 60 to the end part. However, it is noted that the hole 63 is located very close to the inclined section 61 of the plate 60, and the hole 63 reduces the strength of the plate 60 close to the inclined section 61. The plate 60 tends to be broken at the area where the hole 63 and the inclined section 61 are located.

The present invention intends to provide a plate for an adaptor bar to eliminate shortcomings mentioned above.

SUMMARY OF THE INVENTION

The present invention relates to an adaptor bar and comprises a tube unit including an inner tube and an outer tube, and the inner tube includes a first end thereof slidably inserted into a first end of the outer tube. Two end parts are respectively connected to two respective second ends of the inner tube and the outer tube. Two hooks are respectively fixed to the two respective second ends of the inner tube and the outer tube. Each hook includes a first connection portion. Two plates are respectively connected to the two end parts. Each plate includes a first section, a second section and a third section, wherein the second section is formed between the first and third sections. The third section of each plate is fixed to the end part corresponding thereto. The first section of each plate is removably engaged with the first connection portion of the hook corresponding thereto so as to close the hook. The first section includes a first recess and a second recess formed to the first side thereof. The second recess is located close to the second section and includes a recessed reinforcement area located around the second recess so as to reinforce a portion between the first and second section.

Preferably, a first sleeve is mounted to outside of each of the hooks, and a second sleeve is mounted to outside of each of the plates.

Preferably, the first and second recesses and the reinforcement recessed area of each plate are made by way of pressing.

Preferably, a protrusion is formed from a second side of each of the plates and located corresponding to the reinforcement recessed area.

Preferably, two curved ridges protrude from outer periphery of the reinforcement recessed area of each plate.

The primary object of the present invention is to provide a plate of a hook for an adaptor bar, wherein the plate includes a recessed reinforcement area located close to the inclined section of the plate. The recessed reinforcement area is located around the second recess of the plate so as to reinforce a portion between the first and second section.

Another object of the present invention is to provide a plate of a hook for an adaptor bar, wherein the first and second recesses and the reinforcement recessed area of each plate are made by way of pressing which reduces manufacturing cost.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIGS. 5-1, 5-2 and 5-3 show the plate of the present invention in different angles;

FIG. 6-1 shows a top view of the plate of the present invention, and

FIG. 6-2 shows a side view of the plate of the present invention.

DETAILED DESCRIPTION OF THE PREFERRED EMBODIMENT

Figure 1:
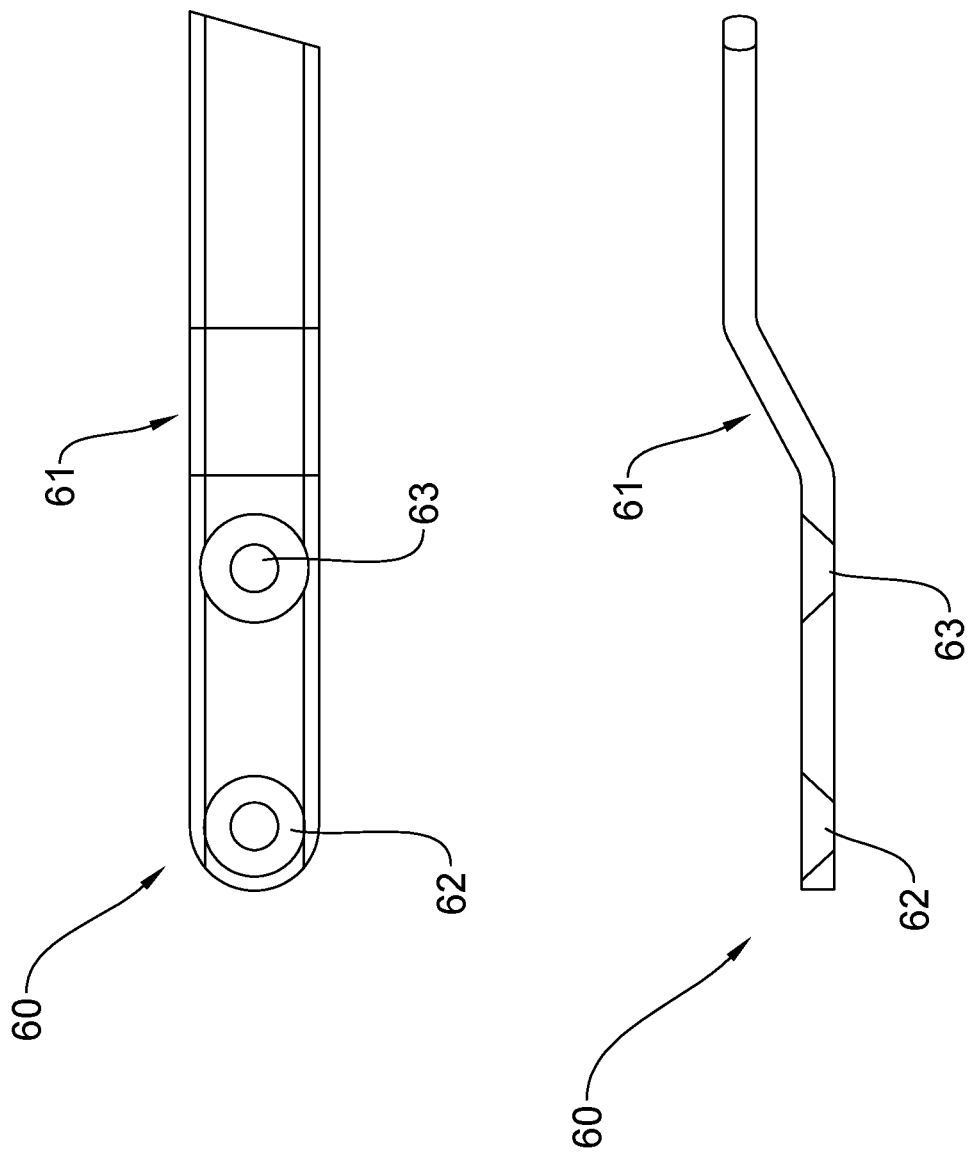
FIG. 1 shows the conventional plate used to the hook of conventional adaptor bar.

Referring to FIGS. 2 to 6, an adaptor bar 100 comprises a tube unit 10, two end parts 20, two hooks 30 and two plates 40 of the present invention, wherein the two plates 40 of the present invention are used to the hooks 30.

The tube unit 10 includes an inner tube 11 and an outer tube 12. The inner tube 11 includes a first end thereof slidably inserted into a first end of the outer tube 12. The two end parts 20 are respectively connected to two respective second ends of the inner tube 11 and the outer tube 12. The two hooks 30 are respectively fixed to the two respective second ends of the inner tube 11 and the outer tube 12. Each hook 30 is a C-shaped hook and includes an opening via which the head tube and the seat post of a bicycle (not shown) are inserted into the hook 30.

The inner tube 11 includes a first groove 111 formed axially in the outside thereof, and the outer tube 12 includes a second groove 121 formed axially in the outside thereof. The outer tube 12 further includes an end collar which has a rail protruding radially from the inner periphery thereof. The rail are engaged with the first groove 111 to allow the inner tube 11 to be slid relative to the outer tube 12.

Preferably, the two end parts 20 each have a button (not shown) to brake the movement of the end parts 20.

Figure 2:
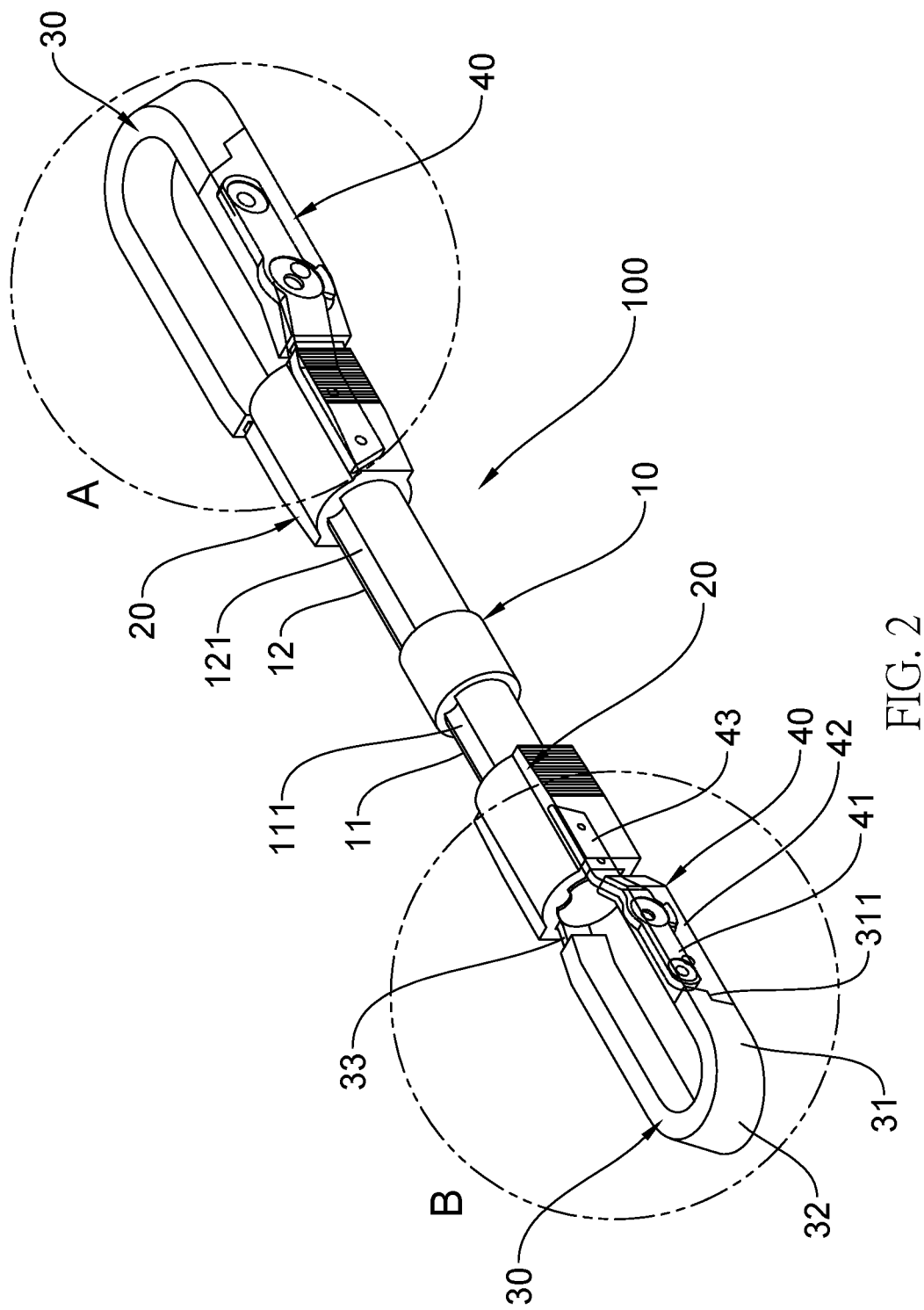
FIG. 2 is a perspective view to show the adaptor bar with the plates of the present invention.
Figure 3:
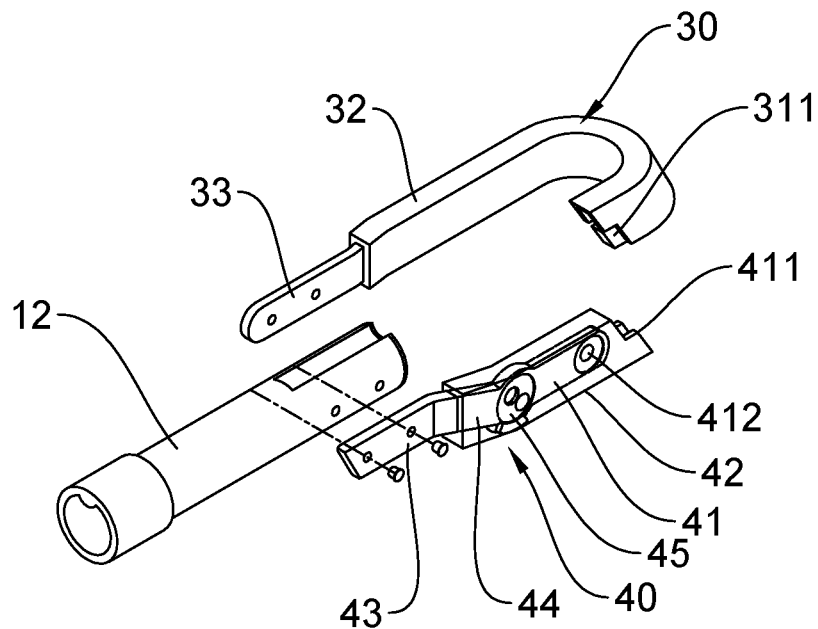
FIG. 3 is an exploded view of the circled area "A" in FIG. 2.
Figure 4:
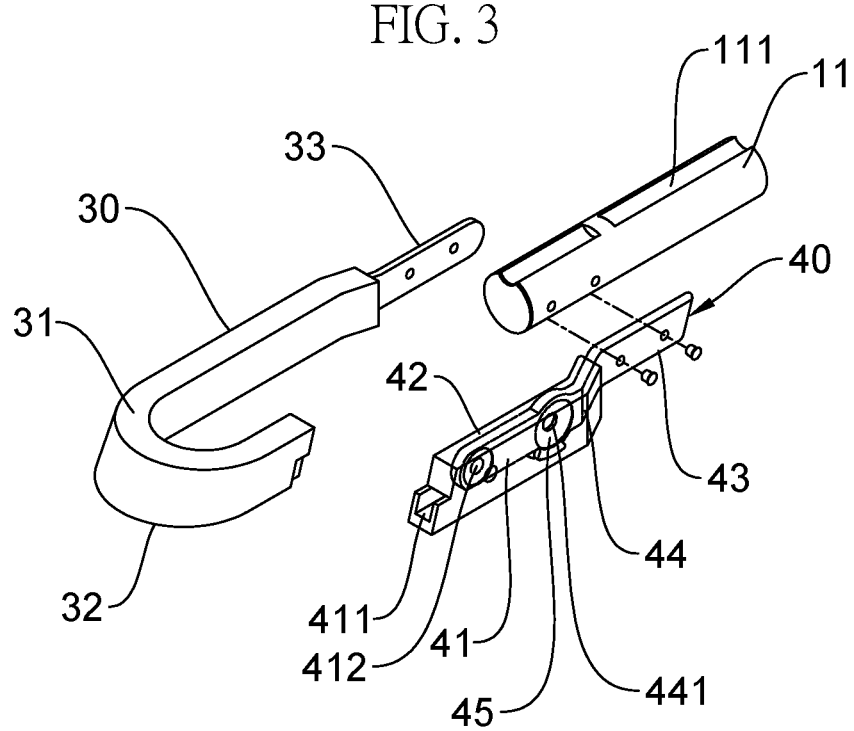
FIG. 4 is an exploded view of the circled area "B" in FIG. 2.
Figures 1, 5:
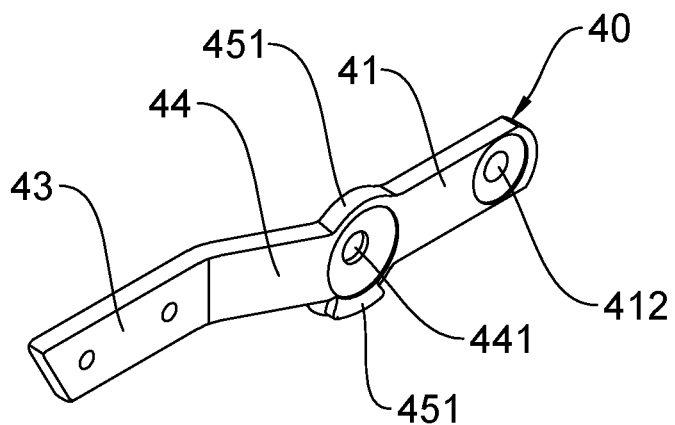
Figures 2, 5:
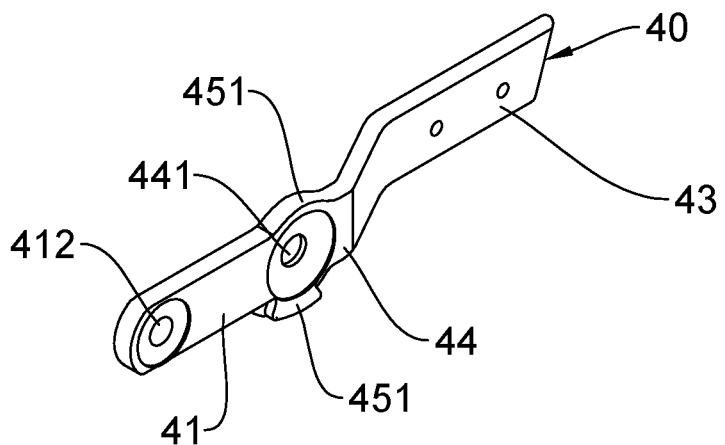
Figures 3, 5:
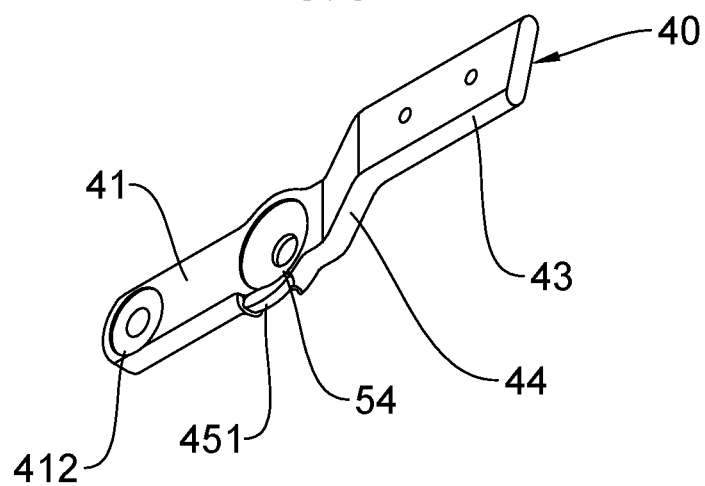
Figures 1, 6:
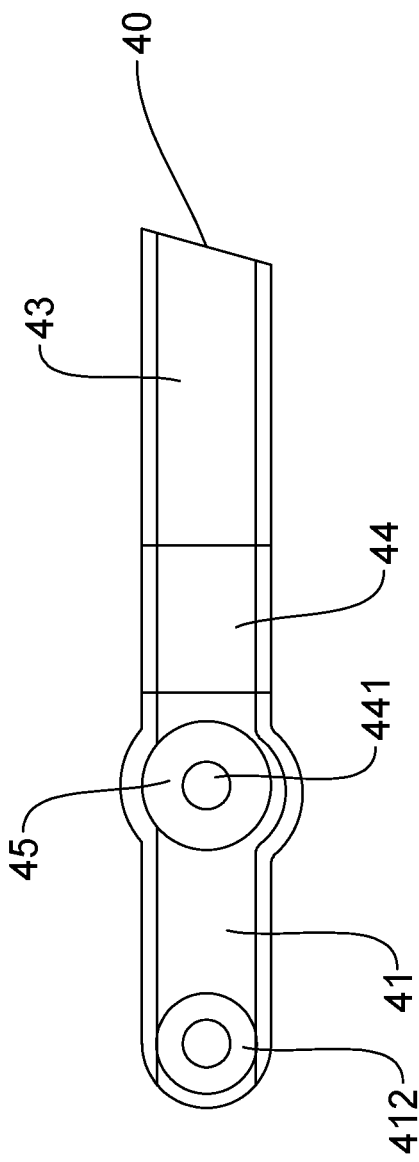
Figures 2, 6:
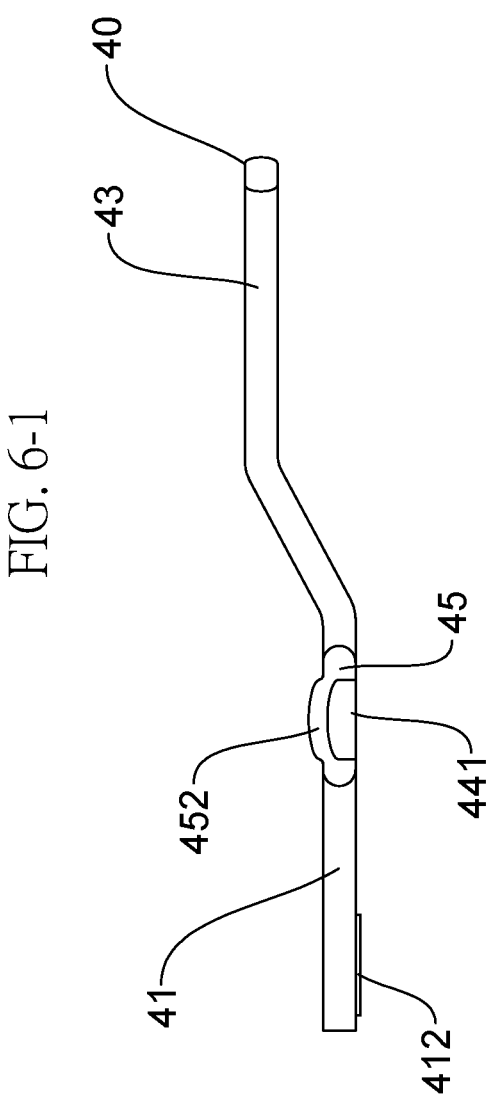

Each hook 30 as shown in FIGS. 2 to 4, is made by a curved metal part, and a first sleeve 32 is mounted to outside of each of the hooks 30. Each hook 30 includes a hook end 31 and a fixed end 33. A first connection portion 311 is formed to the hook end 31 which is one end of the opening of the hook 30. The fixed end 33 extends through the end part 20 and is fixed to the inner tube 11 or the outer second tube 12.

The two plates 40 are respectively connected to the two end parts 20. Each plate 40 includes a first section 41, a second section 44 and a third section 43, wherein the second section 44 is formed between the first and third sections 41, 43. That is to say, the axis of the second section 44 is inclined relative to two respective axes of the first and third sections 41, 43. The third section 43 of each plate 40 is fixed to the end part 20 corresponding thereto. The first section 41 of each plate 40 is removably engaged with the first connection portion 311 of the hook 30 corresponding thereto to close the opening or to open the opening. The first section 41 includes a first recess 412 and a second recess 441 formed to a first side thereof, wherein the second recess 441 is located close to the second section 44 and includes a recessed reinforcement area 45 located around the second recess 441 so as to reinforce a portion between the first and second section 41, 44. Each plate 40 further includes a second connection portion 411 which is detachably engaged with the first connection portion 311 of the hook 30. A second sleeve 42 is mounted to outside of each of the plates 40. The first and second recesses 412, 441 and the reinforcement recessed area 45 of each plate 40 are made by way of pressing. By the pressing to form the reinforcement recessed area 45, a protrusion 452 is formed from the second side of each of the plates 40 and located corresponding to the reinforcement recessed area 45. The protrusion 452 reinforces the strength of the plate 40 and increases contact area with the second sleeve 42 such that the second sleeve 42 is secured to the plate 40. When pressing the plate 40 to form the reinforcement recessed area 45, two curved ridges 451 protrude from outer periphery of the reinforcement recessed area 45 of each plate 40. The two curved ridges 451 also reinforcement the strength of the plate 40.

While we have shown and described the embodiment in accordance with the present invention, it should be clear to those skilled in the art that further embodiments may be made without departing from the scope of the present invention.

What is claimed is:

1. An adaptor bar comprising:
a tube unit including an inner tube and an outer tube, the inner tube having a first end thereof slidably inserted into a first end of the outer tube;
two end parts respectively connected to two respective second ends of the inner tube and the outer tube;
two hooks respectively fixed to the two respective second ends of the inner tube and the outer tube, each hook having a first connection portion;
two plates respectively connected to the two end parts, each plate having a first section, a second section and a third section, the second section formed between the first and third sections, an axis of the second section being inclined relative to two respective axes of the first and third sections, the third section of each plate being fixed to the end part corresponding thereto, the first section of each plate being removably engaged with the first connection portion of the hook corresponding thereto, the first section having a first recess and a second recess formed to a first side thereof, the second recess located close to the second section and including a recessed reinforcement area located around the second recess so as to reinforce a portion between the first and second section.

2. The adaptor bar as claimed in claim 1, wherein a first sleeve is mounted to an outside of each of the hooks, a second sleeve is mounted to an outside of each of the plates.

3. The adaptor bar as claimed in claim 1, wherein the first and second recesses and the reinforcement recessed area of each plate are made by way of pressing.

4. The adaptor bar as claimed in claim 1, wherein a protrusion is formed from a second side of each of the plates and located corresponding to the reinforcement recessed area.

5. The adaptor bar as claimed in claim 1, wherein two curved ridges protrude from an outer periphery of the reinforcement recessed area of each plate.

* * * * *